United States Patent
McConaughy et al.

(10) Patent No.: US 7,082,728 B1
(45) Date of Patent: Aug. 1, 2006

(54) ELECTRICAL BOX FOR USE WITH INSULATED CONCRETE FORM BUILDING SYSTEMS

(75) Inventors: Drew B. McConaughy, Louisville, CO (US); Brad J. Hebig, Berthoud, CO (US)

(73) Assignee: Plantilock Corporation, Longmont, CO (US)

( * ) Notice: Subject to any disclaimer, the term of this patent is extended or adjusted under 35 U.S.C. 154(b) by 423 days.

(21) Appl. No.: 10/461,752

(22) Filed: Jun. 13, 2003

Related U.S. Application Data

(62) Division of application No. 10/151,909, filed on May 20, 2002, now abandoned.

(51) Int. Cl.
*H01R 13/446* (2006.01)
*H02G 3/08* (2006.01)
*H01H 9/02* (2006.01)
*E84B 5/48* (2006.01)

(52) U.S. Cl. .................... 52/220.1; 52/421; 52/415; 52/565; 174/48; 174/49; 174/50; 264/259; 264/263; 264/271.1; 264/272.11; 264/272.12; 264/272.14; 264/274

(58) Field of Classification Search .......... 52/220.1, 52/421, 415, 565; 174/50, 58, 48, 49; 264/259, 264/263, 271.1, 272.11, 273.12, 272.14, 272.15, 264/274
See application file for complete search history.

(56) References Cited

U.S. PATENT DOCUMENTS

| | | | |
|---|---|---|---|
| 689,414 A * | 12/1901 | Robinson | 220/3.9 |
| 1,235,069 A * | 7/1917 | Skinner | 174/59 |
| 2,181,740 A * | 11/1939 | Reidland | 52/710 |
| 3,633,782 A * | 1/1972 | Bellinger | 220/3.5 |
| 4,214,668 A * | 7/1980 | Neff et al. | 220/3.3 |
| 4,247,738 A * | 1/1981 | Bonato | 174/53 |
| 5,469,347 A * | 11/1995 | Duve et al. | 362/245 |
| 5,646,371 A * | 7/1997 | Fabian | 174/58 |
| 5,679,924 A * | 10/1997 | Young et al. | 174/50 |
| 5,722,208 A * | 3/1998 | Humphrey et al. | 52/220.8 |
| 5,761,858 A * | 6/1998 | Watanabe et al. | 52/169.5 |
| 5,831,212 A * | 11/1998 | Whitehead et al. | 174/50 |
| 5,833,110 A * | 11/1998 | Chandler et al. | 220/3.9 |
| 6,111,197 A * | 8/2000 | Layne | 174/50 |
| 6,268,563 B1* | 7/2001 | Gretz | 174/53 |
| 6,300,567 B1* | 10/2001 | Hayduke et al. | 174/58 |
| 6,355,882 B1* | 3/2002 | Gretz | 174/53 |
| 6,586,679 B1* | 7/2003 | Bashford | 174/58 |
| 6,831,227 B1* | 12/2004 | Weise et al. | 174/58 |

FOREIGN PATENT DOCUMENTS

GB 597476 * 1/1948 ............. 220/3.2

* cited by examiner

*Primary Examiner*—Carl D. Friedman
*Assistant Examiner*—Abdul Manaf
(74) *Attorney, Agent, or Firm*—Pritzkau Patent Group, LLC

(57) ABSTRACT

An electrical box for use with insulated concrete form building systems includes a main body having an electrical box cavity for housing electrical outlets, switches, and electrical connections. The insulated concrete form building systems utilize insulated forms to form concrete and the insulated forms are left in place after the concrete has been poured thereby creating an overall insulated concrete element that includes the concrete and the insulated forms. In accordance with the method and the arrangement of the invention, the electrical box includes an arrangement for attaching the electrical box to the insulated form without requiring the use of any additional fasteners.

11 Claims, 8 Drawing Sheets

US 7,082,728 B1

ELECTRICAL BOX FOR USE WITH INSULATED CONCRETE FORM BUILDING SYSTEMS

This is a Divisional application of prior application Ser. No. 10/151,909, filed on May 20, 2002, now abandoned, the disclosure of which are incorporated herein by reference.

BACKGROUND OF THE INVENTION

The present invention relates generally to electrical boxes for use in building construction that utilizes insulated concrete form building systems.

Recently, many building systems have become available that utilize insulated concrete forms to form concrete walls, floors, ceilings and other structural elements. With these systems, concrete is formed into the desired walls, floors, ceilings, and other elements using concrete forms that are made from a rigid foam insulating material. These systems are commonly referred to as Insulated Concrete Form (ICF) systems. In these systems, the insulated concrete forms are left in place after the concrete is poured thereby creating an overall insulated concrete element that includes the concrete and the insulated forms. These systems are typically modular and relatively easy to assemble. These systems also provide very well insulated and very sturdy structural elements that are relatively cost effective and very energy efficient compared to other building methods. Due to these advantages, this type of system has become more common in recent years.

One of the problems with using ICF systems in construction is that this building system makes the installation of electrical outlets and switches in walls, floors, and ceilings built using an ICF system potentially more difficult compared to conventional wood framing systems. In the case of conventional wood framing systems, a basic structure may be completely rough framed prior to installing any electrical lines and boxes. Once the rough-in framing is complete, electricians are able to install electrical boxes by nailing them to studs and running electrical wires before the installation of any drywall or other wall finish. However, when using ICF systems, the methods used to install electrical boxes and wires are typically different than those used in conventional stick framing.

Currently, two different general approaches to placing electrical boxes and lines in ICF systems are employed. In the first approach, the electrical boxes and electrical conduit that are needed in the ICF formed elements are all installed into the forms before the concrete is poured. In this approach, the electrical conduits are, in most cases, encapsulated within the concrete once it is poured into the insulated forms. In the second approach, the electrical boxes and wires or conduit are installed after the concrete is poured. In this approach, openings are cut into the foam forms after the concrete is poured and the electrical boxes are fastened to the concrete after the concrete has at least partially cured. Channels are also cut into the foam and the wire or conduits are installed into these channels. In both approaches, conventional electrical boxes, conduits, or Romex type wire are used.

When using the general approach in which the electrical boxes and conduit are installed before the concrete is poured, conventional electrical boxes are typically modified so that they may be attached to the insulated forms using fasteners. This modification and attachment of conventional electrical boxes can be vary labor intensive and can add significantly to the labor requirements associated with using the ICF system. In order to illustrate this problem, the typical approach to installing an electrical outlet box in an ICF wall prior to pouring the concrete will be described in more detail. In this example, it will be assumed that there will be an incoming electrical conduit and an outgoing electrical conduit, both of which are to be connected to the electrical box to provide conduits for pulling electrical wires after the concrete has been poured. This is the most common electrical box configuration used when electrical boxes and conduit are installed within the concrete of ICF systems.

As mentioned above, ICF systems are typically modular systems made up of standard sized blocks or panels that are assembled on site to create an overall form that is then filled with concrete. In most systems, the standard sized blocks have a uniform height, for example 16 inches, and have two, spaced apart, foam sidewalls having a particular sidewall thickness, for example 2 inches. Other systems use blocks that are molded and that do not have a constant sidewall thickness but instead have a contoured inner wall surface that causes the foam sidewall thickness to vary throughout the block. For the example being described, it will be assumed that blocks having a constant wall thickness are to be used.

As the blocks are assembled to create the overall forms, openings are cut into the foam blocks and the electrical boxes are installed into these openings. Conduit is then installed within the overall form interconnecting the electrical boxes. The conventional electrical boxes are typically modified so that they may be placed in the openings cut into the foam blocks and attached to the foam insulation of the insulated concrete form as the foam blocks are assembled into the overall forms. For illustrative purposes, the following example will be described using a conventional single gang metal electrical box that is approximately 3½ inches tall, 2 inches wide, and 2 inches deep.

In order to prepare the box for installation, several modifications to the box are typically made. First, in order to accommodate the connection of the two electrical conduits, two conduit sockets are installed on the back of the box by removing two knock-outs from the back wall of the electrical box and attaching the two conduit sockets in the conventional manner so that the conduit sockets extend outward from the back of the electrical box. Next, a mounting plate is fabricated and attached to the back of the electrical box. This mounting plate is typically made from a readily available material such as plywood that is cut to a size somewhat larger that the back of the electrical box, for example, approximately 6 inches by 8 inches. Also, holes are cut into the plywood mounting plate to allow the conduit sockets to protrude through the mounting plate. The mounting plate is then attached to the back of the electrical box using conventional fasteners such as wood screws. Additionally, depending on the thickness of the foam insulation used in the ICF system and depending on the depth of the electrical box being used, shims may need to be used as spacers to cause the electrical box to extend out from the mounting plate a proper distance. This proper distance is a distance that causes the electrical box to extend slightly beyond the outer surface of the foam sidewall when the electrical box assembly is installed into the opening formed into the sidewall of the foam block. This configuration allows electrical outlets or switches to be installed into the electrical box in the conventional manner after drywall has been installed over the ICF wall and over the electrical box that extends slightly from the outer surface of the insulated foam of the insulated concrete wall.

Typically, the openings for the electrical boxes are cut into the upper edge of the foam blocks as the foam blocks are being assembled into the overall insulated concrete form. The modified electrical box assemblies are then inserted into the openings cut into the top edge of the foam blocks with the mounting plate pressed snuggly against the inner surface of the sidewall of the foam block. The electrical box assembly is then attached to the sidewall of the foam block by installing long screws with large washers from the outer surface of the foam block, through the foam sidewall, and into the plywood mounting plate thereby pulling the mounting plate of the electrical box assembly tight against the inner surface of the sidewall of the foam block. Once the electrical box has been attached to the foam block, electrical conduit sweeps may be attached to the conduit sockets of the electrical box assembly and conduit may be attached to the conduit sweeps to interconnect the electrical box assembly with other electrical box assemblies.

In the second general approach used to install electrical boxes and lines in an ICF system, the entire ICF system is assembled and the concrete is poured prior to installing the electrical boxes and lines. Once the concrete has been poured, openings for the electrical boxes are cut into the foam sidewalls and channels for running wires or conduit to interconnect the electrical boxes are cut into the foam sidewalls. These openings and channels may be cut using a router, hot-knife, chainsaw, knife, saw, or other suitable tool and this process is typically a fairly labor intensive process that increases the costs of utilizing this building system. Once the openings and channels are cut, conventional electrical boxes are installed into the openings by power nailing or otherwise fastening the electrical boxes to the concrete wall that has been formed inside the insulated concrete forms. This may be a rather difficult process and may require the use of shims to position the box such that it slightly protrudes out from the outer surface of the foam sidewall of the ICF system in the same manner as described above in the previous example. After the boxes are attached to the concrete, wires or conduit may be installed into channels to interconnect the electrical boxes.

As described above, both of the currently used general approaches to installing electrical boxes and lines in ICF system walls or other elements are more labor intensive than conventional methods of installing electrical boxes in conventional stick framing systems. This increases the costs of building and time required for building when an ICF system is being utilized compared to a conventional building system. The present invention provides improved methods and improved electrical boxes that substantially reduce the time and labor requirements for installing electrical boxes in walls and other elements of an ICF building system.

SUMMARY OF THE INVENTION

As will be described in more detail hereinafter, electrical boxes for use with insulated concrete form building systems that utilize insulated forms to form concrete elements are disclosed herein. In these building systems, the insulated forms are left in place after the concrete has been poured thereby creating an overall insulated concrete element that includes the concrete and the insulated forms. Methods for installing these electrical boxes are also disclosed.

In accordance with the invention, the electrical box includes a main body having an electrical box cavity for housing electrical outlets, switches, and electrical connections. The electrical box also includes an attaching arrangement for attaching the electrical box to the insulated form without requiring the use of any additional fasteners to attach the electrical box to the insulated form. The electrical box may be a single gang box for housing an outlet, switch, or electrical connection. Alternatively, the electrical box may be a multiple gang electrical box including a main body having an electrical box cavity for housing multiple outlets, switches, or electrical connections.

In one embodiment, the insulated form includes foam insulation and the attaching arrangement includes opposing mounting flanges for gripping the foam insulation of the insulated forms when the electrical box is installed in an opening formed into the foam insulation of the insulated form. In one version of this embodiment, the main body of the electric box includes at least one sidewall and a back wall that together define the electrical box cavity. The foam insulation of the insulated form defines an external planar surface of the insulated form. The attaching arrangement is configured such that, when the electrical box is attached to the foam insulation of the insulated form, the sidewall of the electrical box protrudes beyond the external planar surface of the insulated form by a predetermined distance. The opposing mounting flanges may be integrally formed as part of the electrical box. Alternatively, the opposing mounting flanges may be provided as at least one separate flange element configured to attach to the electrical box.

In a preferred version of the above described embodiment, the foam insulation of the insulated form has a predetermined foam thickness and the opposing mounting flanges of the attaching arrangement include at least one pair of opposing flanges that are spaced apart by a distance substantially equal to the thickness of the foam insulation. Alternatively, the opposing mounting flanges of the attaching arrangement may include at least one pair of opposing flanges that are spaced apart by a distance greater than the thickness of the foam insulation. In this case, the attaching arrangement may include a spacer configured to attach to one of the mounting flanges of the pair of opposing mounting flanges to reduce the spacing between the pair of opposing mounting flanges such that the resulting spacing between the spacer and the opposing mounting flange of the pair of opposing mounting flanges is substantially equal to the thickness of the foam insulation.

In another embodiment, the main body of the electric box includes at least one sidewall and a back wall that together define the electrical box cavity for housing electrical connections. In this embodiment, the back wall of the electrical box includes a substantially clear window portion configured to allow the viewing of the interior of the insulated form thereby allowing a viewer to confirm that air pockets do not remain in the concrete in the area of the electrical box after concrete has been poured into the insulated forms.

In another embodiment, the electrical box is a molded plastic box and the main body of the electric box includes at least one sidewall and a back wall that together define the electrical box cavity for housing electrical connections. In this embodiment, the back wall of the electrical box includes at least one conduit socket extending outward from the back wall of the electrical box. The conduit socket is integrally formed as part of the electrical box and the conduit socket provides a port to allow for the entrance and exit of electrical conductors. The conduit socket is also configured to mate with standard plastic electrical conduit. In one version of this embodiment, the conduit socket is a substantially tubular shaped structure having an inside diameter and an outside diameter. The inside diameter of the conduit socket is a diameter that allows for the insertion and conventional attachment of standard ½ inch plastic electrical conduit within the conduit socket and the outside diameter of the conduit socket is a diameter that allows for the insertion and conventional attachment of standard ¾ inch plastic electrical conduit around the outside of the conduit socket. Additionally, the electrical box may include two or more conduit sockets extending outward from the back wall of the electrical box with the two conduit sockets being offset relative to one another both vertically and horizontally on the back wall of the electrical box.

In another embodiment, the main body of the electric box includes at least one sidewall and a back wall that together define the electrical box cavity for housing electrical connections and that define an external shape of the electrical box. In this embodiment, the attaching arrangement includes at least one protrusion protruding from the sidewall of the electrical box. The protrusion is configured to retain the electrical box within an opening that is formed into the insulated form when the electrical box is pressed into the opening formed into the insulated form. In this case, the opening that is formed into the insulated form would be formed substantially the same size and shape as the external shape of the electrical box. The protrusion may be integrally formed as part of the electrical box. Alternatively, the protrusion may be provided as at least one separate element configured to attach to the electrical box.

BRIEF DESCRIPTION OF THE DRAWINGS

The features of the present invention may best be understood by reference to the following description of the presently preferred embodiments together with the accompanying drawings in which.

DETAILED DESCRIPTION OF THE PREFERRED EMBODIMENTS

Figure 1:
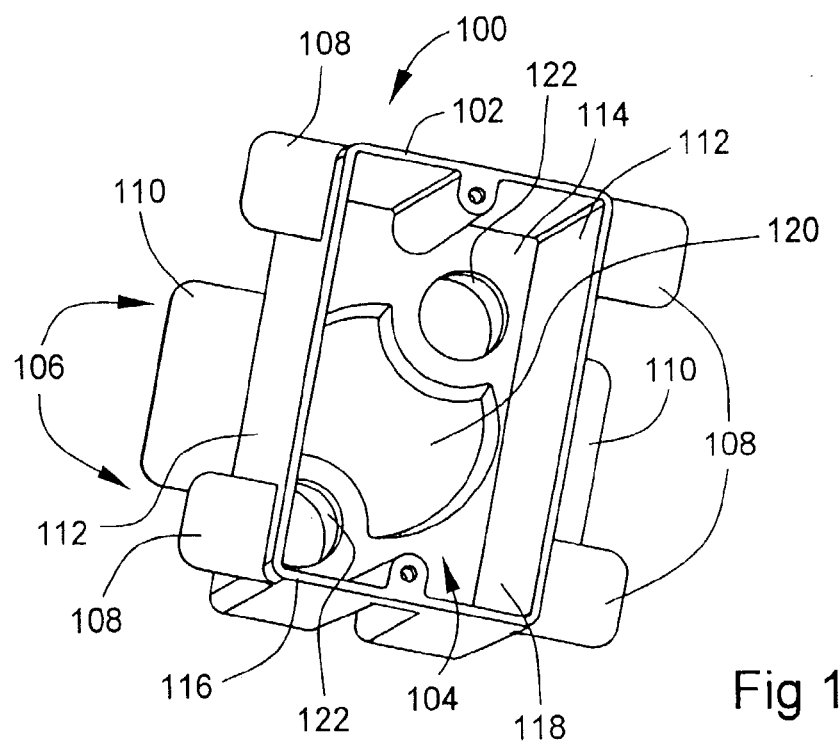
FIG. 1 is a front diagrammatic perspective view of an electrical box designed in accordance with the present invention including opposing mounting flanges.
Figure 2:
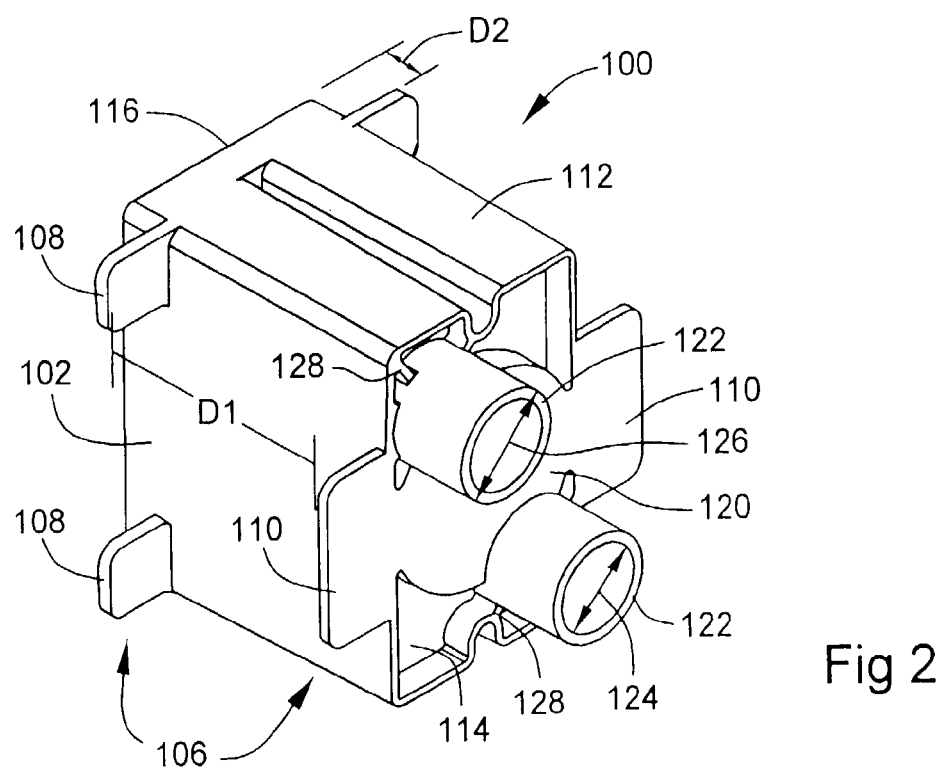
FIG. 2 is a rear diagrammatic perspective view of the electrical box of FIG. 1.

Turning to the drawings, wherein like components are designated by like reference numerals throughout the various figures, attention is initially directed to FIGS. 1 and 2. FIG. 1 is a front diagrammatic perspective view of an electrical box 100 designed in accordance with the present invention for use with insulated concrete form (ICF) building systems that utilize insulated forms to form concrete elements. In these building systems, the insulated forms are left in place after the concrete has been poured thereby creating an overall insulated concrete element that includes the concrete and the insulated forms. FIG. 2 is a rear diagrammatic perspective view of box 100.

In accordance with the invention, electrical box 100 includes a main body 102 having an electrical box cavity 104 for housing electrical outlets, switches, or electrical connections (not shown). Electrical box 100 also includes an attaching arrangement 106 for attaching the electrical box to an insulated form of an ICF system. In accordance with the invention, attaching arrangement 106 is configured to allow box 100 to be attached to the foam sidewall of an insulated form block without requiring the use of any additional fasteners to attach the electrical box to the insulated form. This feature allows electrical boxes designed in accordance with the invention to be quickly and easily installed in an ICF system thereby substantially reducing the time required to install electrical boxes in ICF systems compared to prior art approaches.

As mentioned above, ICF systems are typically modular systems made up of standard sized blocks or panels that are assembled on site to create an overall form that is then filled with concrete. In most systems, the standard sized blocks have a uniform overall height, width, and length. The blocks are typically made up of two spaced apart foam sidewalls that have a particular sidewall thickness with 2 inches being a common foam sidewall thickness used for this type of system. Although 2 inches is used here as an example of a typical sidewall thickness, this is not a requirement. Various systems use various insulated foam sidewall thicknesses and the present invention would equally apply regardless of the thickness of the sidewalls of the system. As also mentioned above, other systems use blocks that are molded and that do not have a constant sidewall thickness but instead have a contoured inner wall surface that causes the foam sidewall thickness to vary throughout the block. The present invention would equally apply to these contoured inner wall systems.

In the embodiment illustrated in FIGS. 1 and 2, attaching arrangement 106 includes two pairs of opposing mounting flanges 108 and 110 for gripping the foam insulation of an insulated form. Electrical box 100 includes sidewalls 112 and back wall 114 which together define cavity 104. Sidewalls 112 have a front edge 116 that extends around all of sidewalls 112 to define a front opening 118 of box 100 (shown in FIG. 1). In this embodiment, opposing pairs of flanges 108 and 110 project outward from sidewalls 112 of box 100. Flanges 108 are located near front opening 118 of the box and flanges 110 are located near back wall 114 of box 100. The two opposing pairs of mounting flanges 108 and 110 are configured to hold the box in place when the electrical box is installed in an opening formed into the foam insulation of the insulated form. In accordance with the invention, the pairs of opposing flanges 108 and 110 are capable of holding the box in place without requiring the use of any additional fasteners to attach the electrical box to the insulated form as will be described in more detail hereinafter with reference to FIGS. 10*a* and 10*b*.

The embodiment of box 100 shown in FIGS. 1 and 2 is designed for use with an ICF system that has foam sidewalls that have a uniform thickness, for example 2 inches. Therefore, flanges 108 and 110 are spaced apart from one another by a distance D1 (shown in FIG. 2), which in this example would be about 2 inches. Although distance D1 has been described as being uniform and about 2 inches for illustrative purposes, it should be understood that distance D1 may be any desired distance, uniform or not, so long as the flanges are configured to allow box 100 to be attached to the foam sidewall of the ICF system without requiring the use of any additional fasteners to attach the electrical box to the insulated form.

Typically, ICF systems are designed to have drywall installed over the interior surfaces of any walls that are formed using this type of a system. In order to accommodate this, flanges 108 are substantially perpendicular to sidewalls 112 and generally parallel with the plane defined by front edge 116. Flanges 108 are also set back a distance D2 from front edge 116 of box 100 as shown in FIG. 2. This setback causes front edge 116 of box 100 to project outward a distance about equal to distance D2 from the foam insulation of the ICF system when the box is installed in the foam sidewall of the insulated form. Preferably, distance D2 is selected to be a distance that is approximately equal to the thickness of the drywall that is to be installed over the ICF system wall. This allows front edge 116 of box 100 to project through an opening that would be cut into the drywall when the drywall is installed. This causes front edge 116 to end up substantially flush with the finished surface of the drywall once the drywall is installed.

Although box 100 has been described as having flanges 108 recessed, or set back from front edge 116 of box 100, this is not a requirement. Instead, flanges 108 may be located flush with front edge 116 or at any other specific location desired so long as flanges 108 cooperate with flanges 110 to attached box 100 to the foam sidewall of the ICF system without requiring the use of any additional fasteners.

Figure 3:
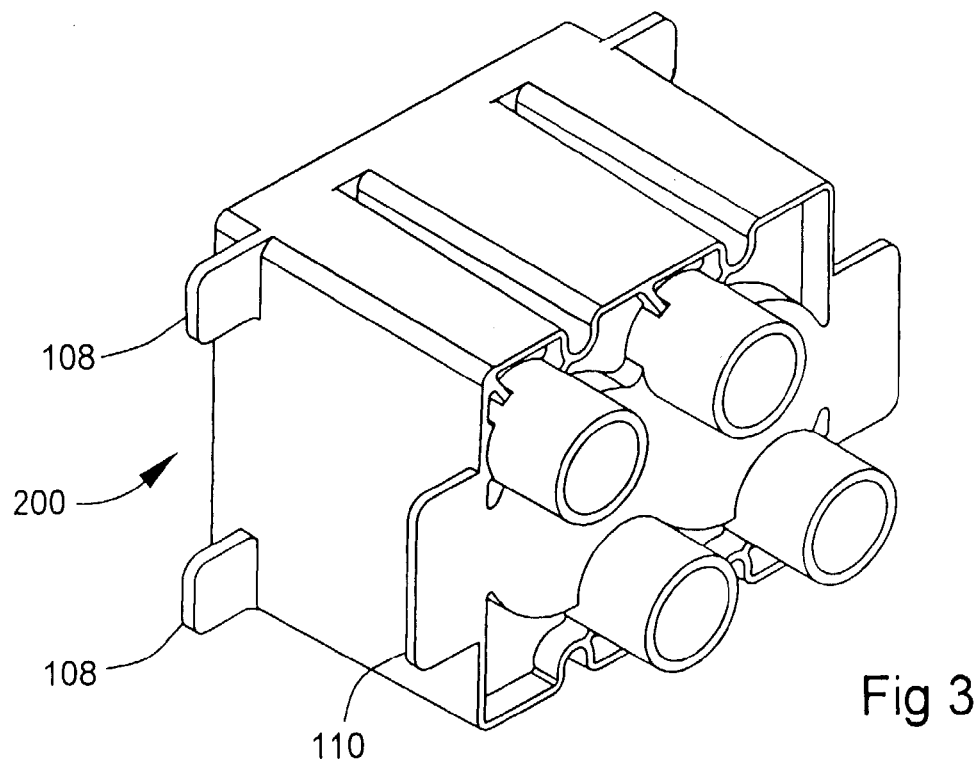
FIG. 3 is a rear diagrammatic perspective view of a two-gang electrical box designed in accordance with the present invention.
Figure 4:
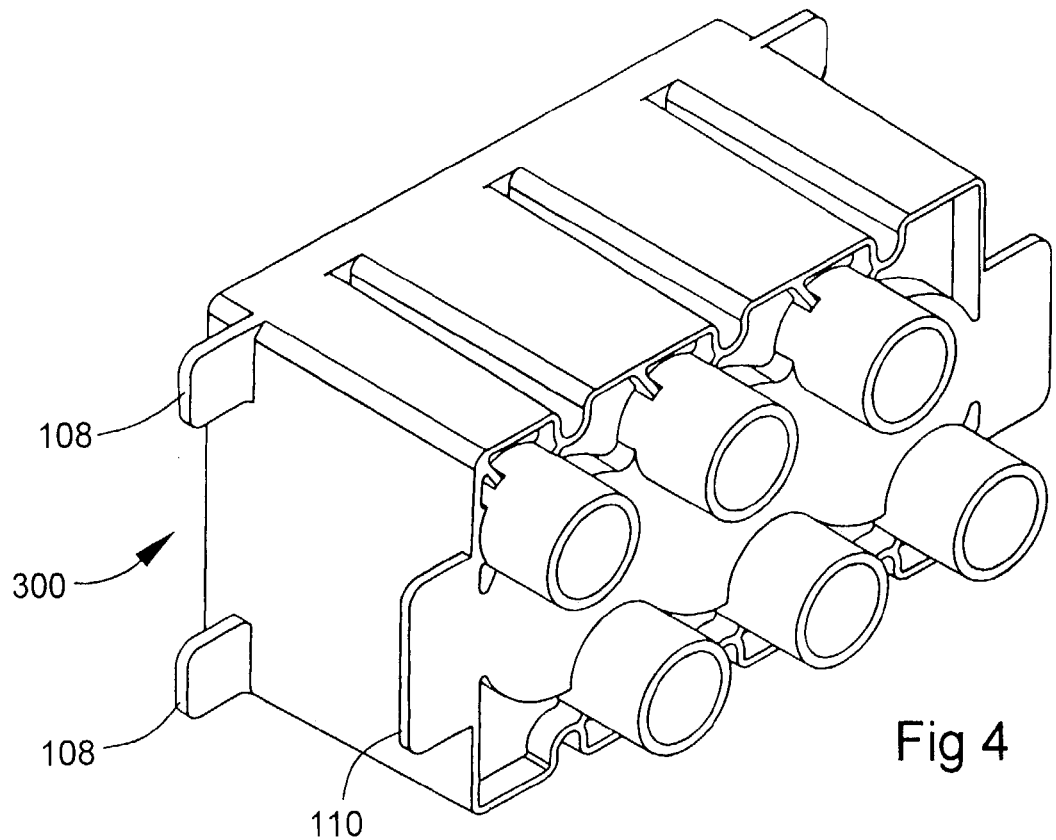
FIG. 4 is a rear diagrammatic perspective view of a three-gang electrical box designed in accordance with the present invention.

As illustrated in FIGS. 1 and 2, electrical box 100 may be a single gang electrical box for housing an outlet, switch, or electrical connection. However, this is not a requirement of the invention. Instead, it should be understood that the electrical box may be a multiple gang electrical box including a main body having an electrical box cavity for housing multiple outlets, switches, or electrical connections as illustrated by electrical boxes 200 and 300 in FIGS. 3 and 4 respectively. In the specific examples illustrated, box 200 of FIG. 3 is a two-gang box and box 300 of FIG. 4 is a three-gang box. In both cases, boxes 200 and 300 include two pairs of mounting flanges 108 and 110 similar to those described above for box 100.

In another aspect of the invention and as illustrated in FIGS. 1 and 2, back wall 114 of the electrical box includes a substantially clear window portion 120. Window portion 120 is configured to allow a viewer to view the interior of the insulated form from outside of the form. This is made possible because opening 118 of box 100 allows a viewer to see the inside back wall of box 100 when it is installed in the foam insulation of an ICF system as herein described. Therefore, providing clear portion 120 in back wall 114 allows a viewer to see inside of the insulated form once the insulated forms are assembled with electrical boxes designed in accordance with the invention installed in the forms. This ability to view the interior of the forms at the locations of the electrical boxes allows a viewer to confirm that air pockets do not remain in the concrete in the area of the electrical box after concrete has been poured into the insulated forms.

Window portion 120 of box 100 may be provided in a wide variety of ways. For example, the entire box may be molded using clear material to form the entire box. With this approach, portions of the box may be painted or otherwise coated if desired. Alternatively, window portion 120 may be provided as a separate piece that snaps into an opening formed into back wall 114 of box 100. Although only a couple of examples of how window portion 120 may be provided have been describe, it should be understood that window portion 120 may be provided in a wide variety of manners, all of which would fall within the scope of the invention.

In still another aspect of the invention that is illustrated in FIGS. 1 and 2, electrical box 100 is a molded plastic box and back wall 114 of the electrical box 100 includes conduit sockets 122 extending outward from back wall 114 of electrical box 100. In this embodiment, conduit sockets 122 are integrally formed as part of electrical box 100 and conduit sockets 122 provide a port to allow for the entrance and exit of electrical conductors (not shown). Conduit sockets 122 are also configured to mate with standard plastic electrical conduit. Preferably, conduit sockets 122 are a substantially tubular shaped structure having an inside diameter 124 and an outside diameter 126 as shown in FIG. 2. In this embodiment, inside diameter 124 of each conduit socket 122 is a diameter that allows for the insertion and conventional attachment of standard ½ inch plastic electrical conduit (not shown) within conduit socket 122. Also, outside diameter 126 of each conduit socket 122 is a diameter that allows for the insertion and conventional attachment of standard ¾ inch plastic electrical conduit (not shown) around the outside of the conduit socket. This configuration allows for a wide variety of options when connecting either ½ or ¾ inch standard plastic electrical conduit to conduit sockets 122.

As mentioned above, when an electrical box that has conduit sockets located at the back of the box (like box 100) is used in an ICF system, the conduits are installed within the insulated forms before the concrete is poured. This means that the electrical boxes and conduits must be configured to be capable of withstanding the forces that result from pouring concrete into the forms and over the conduits. Therefore, box 100 preferably includes gussets 128 for stiffening the area around conduit sockets 122. This feature may be used to provide additional strength to box 100 around conduit sockets 122 to help prevent damage to the box that has the potential to occur when concrete is poured into the insulated forms and over the conduits that have been attached to the electrical boxes.

As illustrated in FIGS. 1 and 2, the two conduit sockets 122 included in box 100 are offset relative to one another both vertically and horizontally on back wall 114 of electrical box 100. Although this is not a requirement of the invention, this configuration allows more flexible placement of conduit within an ICF system by allowing both horizontal and vertical running conduits to be connected to electrical box 100 in a variety of ways without having the conduits interfere with one another. Also, although conduit sockets 122 have been described as being integrally molded as part of box 100 and as protruding from the back wall of the electrical box, these are not requirements. Instead, it should be understood that the conduit sockets may be placed on the sides of the electrical box, in different positions on the back wall of the electrical box, or in any other desired location. Additionally, conduit sockets may be provided as separate elements that are attached to the electrical box in any suitable and readily providable manner and still remain within the scope of the invention.

Figure 5A:
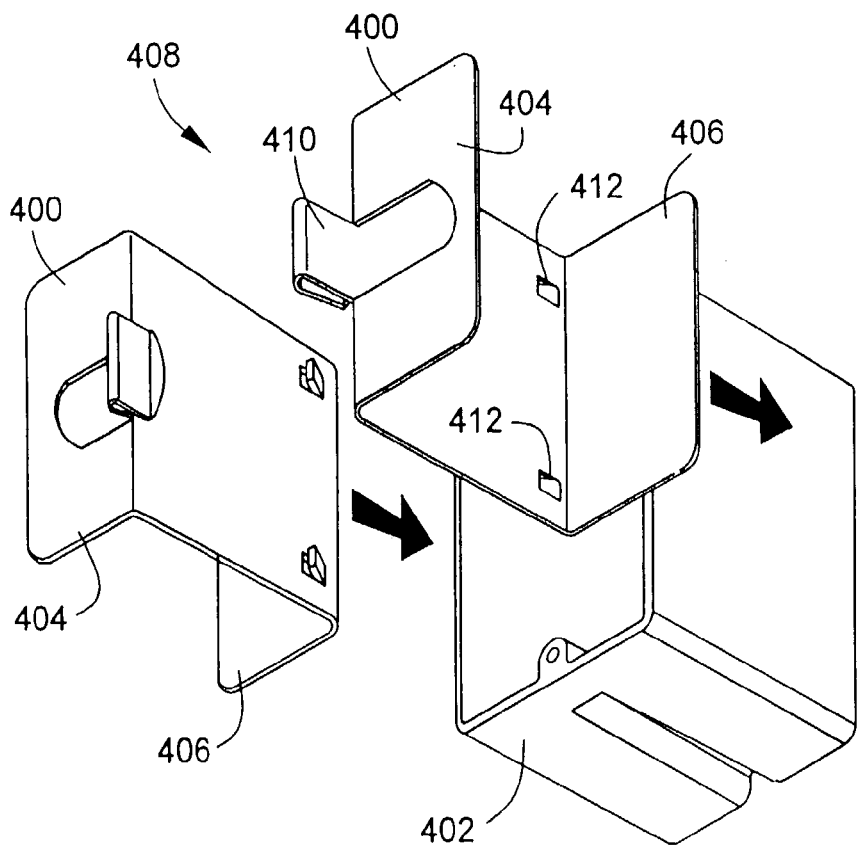
FIGS. 5a and 5b are front diagrammatic perspective views of an electrical box designed in accordance with the present invention including flange clips that may be attached to the electrical box.
Figure 5B:
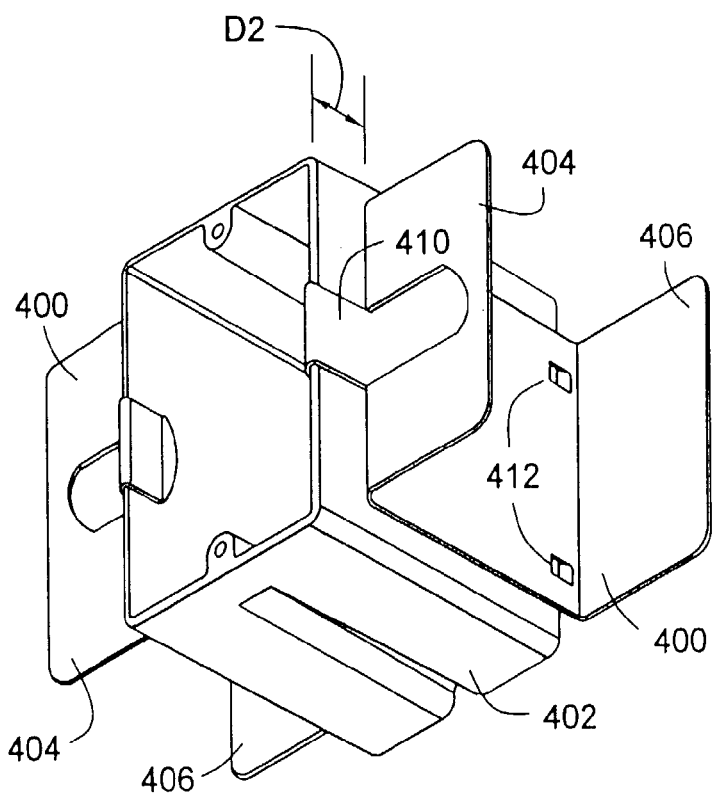

Although opposing mounting flanges 108 and 110 have been thus far illustrated as being integrally formed as part of overall electrical box 100, this is not a requirement of the invention. Alternatively, the opposing mounting flanges may be provided as separate flange elements 400 configured to attach to a more conventional electrical box 402 as illustrated in FIGS. 5a and 5b. In the embodiments of FIGS. 5a and 5b, both flange elements 400 include flanges 404 and 406 that are similar to flanges 108 and 110 described above for FIGS. 1 and 2. Also, flange elements 400 may be configured such that, when they are installed onto box 402, flanges 404 end up recessed a predetermined distance D2 in a manner similar to that described above for flanges 108.

In the embodiment shown in FIGS. 5a and 5b, flange elements 400 include a fastening arrangement 408 for connecting flange elements 400 to box 402. In this case, fastening arrangement 408 includes a retaining clip 410 and barbs 412 which cooperate to retain flange element 400 on box 402 when retaining clip 410 is slid over the front edge of box 402 such that barbs 412 hook over the back edge of box 402. Although fastening arrangement 408 has been described as including retaining clip 410 and barbs 412, this is not a requirement. Instead, any readily providable method of fastening flange elements 400 to box 402 may be used and still remain within the scope of the invention. These other methods of attaching flange elements 400 may include, but are not limited to, screws or other conventional fasteners, some combination of groves and clips formed into either the electrical box or the flange element, or any other suitable and readily providable fastening arrangement.

Figure 6A:
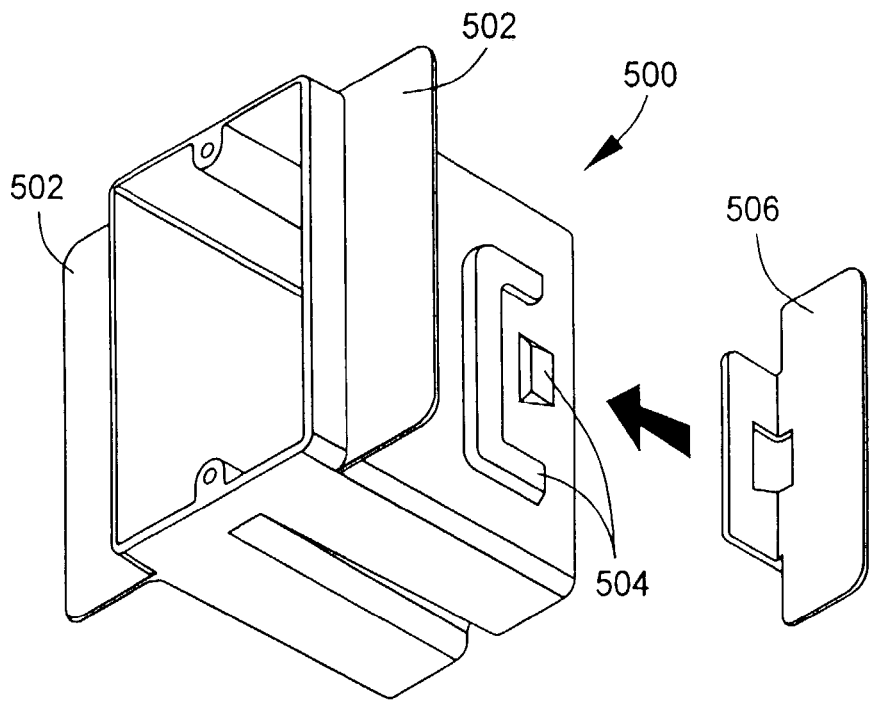
FIGS. 6a and 6b are front diagrammatic perspective views of an electrical box designed in accordance with the present invention including a second embodiment of flange clips that may be attached to the electrical box.
Figure 6B:
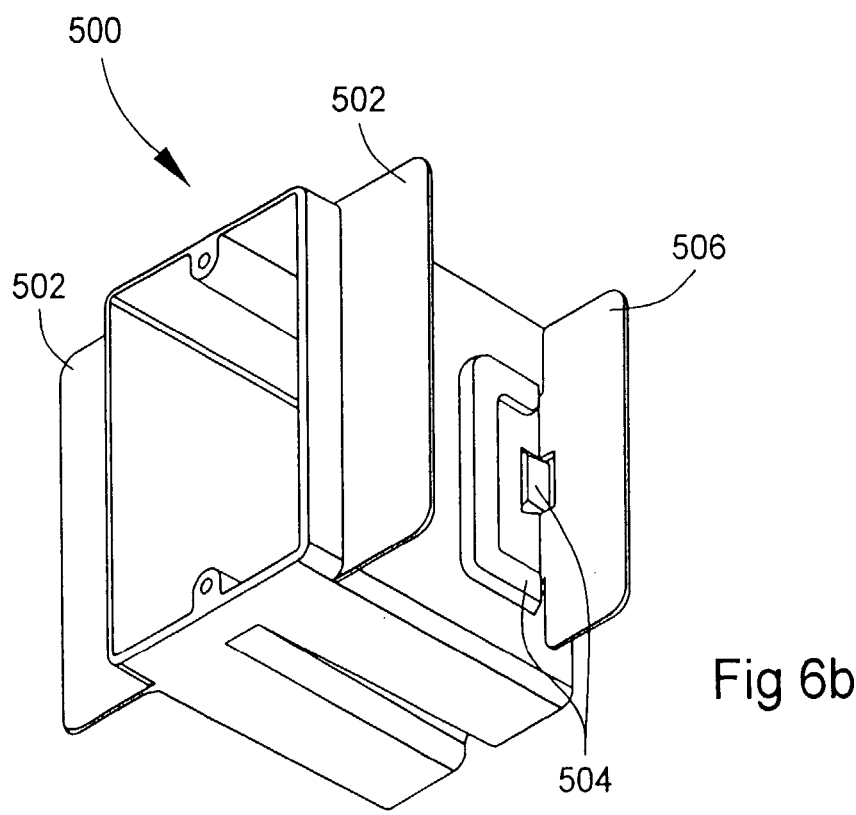

Referring now to FIGS. 6a and 6b, another arrangement for providing an electrical box with mounting flanges designed in accordance with the invention will be briefly described. In this embodiment, a box 500 includes two front mounting flanges 502 that are integrally formed as part of box 500. Flanges 502 are similar to, and function in the same general way as previously described flanges 108 and 404 of FIGS. 1 and 5A respectively. A clip fastening arrangement 504 is also integrally formed as part of box 500 and a flange clip 506 designed in accordance with the invention attaches to box 500 by engaging with clip fastening arrangement 504 as illustrated in FIGS. 6a and 6b. Although fastening arrangement 504 is illustrated in FIGS. 6a and 6b as being a channel and protrusion designed to retain flange clip 506 within the channel, this is not a requirement. Instead, as described above with regard to fastening arrangement 408 in FIGS. 5a and 5b, the fastening arrangement for attaching flange clip 506 to box 500 may take a wide variety of forms and still remain within the scope of the invention.

As was described above for flanges 108 and 110 of box 100, flanges 502 and 506 cooperate to provide opposing flanges that are capable of holding box 500 in place in a foam sidewall of an ICF system without requiring the use of any additional fasteners to attach the electrical box to the insulated form. Although only one flange clip 506 is illustrated in FIGS. 6a and 6b, it should be understood that box 500 may include two clip fastening arrangements and associated flange clips located on opposite sidewalls of box 500. This would provide two pairs of opposing flanges in a manner similar to those shown in each of the previous figures.

As mentioned previously, different ICF systems utilize foam insulation sidewalls of different uniform thicknesses, or, in some cases, they may utilize contoured sidewalls that vary in thickness. In these situations, the uniform spacing, for example distance D1 in FIG. 2, between the pairs of opposing flanges that have been described thus far may not provide the correct spacing between opposing flanges to allow the opposing flanges to properly grip the foam sidewall of the insulated forms. In other words, the opposing mounting flanges of the attaching arrangements described above may include opposing flanges that are spaced apart by a distance greater than the thickness of the foam insulation into which the electrical box is to be installed. In this case, and as will be described with reference to FIG. 7, the attaching arrangement may include a spacer configured to attach to one or more of the mounting flanges of the pair of opposing mounting flanges to reduce the spacing between the pair of opposing mounting flanges. The spacer would be attached in such a way that the resulting spacing between the spacer and the opposing mounting flange of the pair of opposing mounting flanges is reduced to be substantially equal to the thickness of the foam insulation into which the box is to be installed.

Figure 7:
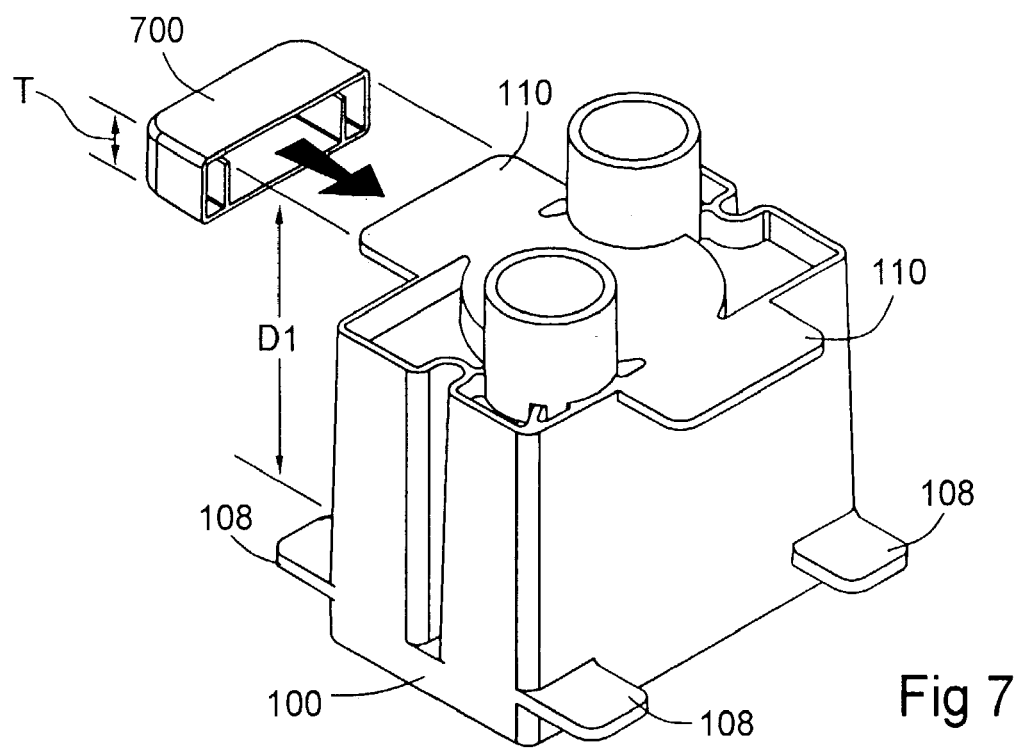
FIG. 7 is a rear diagrammatic perspective view of the electrical box of FIG. 1 including a spacer for adjusting the spacing between mounting flanges.

FIG. 7 is a perspective view of electrical box 100 including mounting flanges 108 and 110 as described above with reference to FIGS. 1 and 2. However, as shown in FIG. 7, a spacer 700 is also provided for reducing the spacing between flanges 108 and 110. In this embodiment, spacer 700 has a thickness T and is configured to slidably attach to flange 110 such that, when spacer 700 is attached to flange 110 of box 100, the spacing between flange 108 and spacer 700 is a distance less than distance D1. In the example shown, the spacing between flange 108 and spacer 700 would be approximately equal to the distance D1 minus the thickness T of spacer 700.

Although spacer 700 is illustrated as being slidably attached to flange 110, it should be understood that other methods of attaching spacer 700 to box 100 may be utilized and still fall within the scope of the invention. Also, although spacer 700 is illustrated as having a particular configuration, the spacer may take on a wide variety of specific forms and still fall within the scope of the invention so long as the spacer is capable of reducing the spacing between flanges 108 and 110 as described above and so long as the combination of the spacer and the flanges of the electrical box cooperate to allow the electrical box to be attached to the foam sidewall of an insulated form block without requiring the use of any additional fasteners to attach the electrical box to the insulated form.

Although each of the embodiments described up to this point have utilized opposing flanges as the attaching arrangement for attaching the electrical box to the insulated foam, this is not a requirement. Instead, a wide variety of attaching arrangements may be utilized to attach the electrical box to the insulated form so long as the attaching arrangement allows the electrical box to be attached to the foam sidewall of an insulated form block without requiring the use of any additional fasteners to attach the electrical box to the insulated form.

Figure 8:
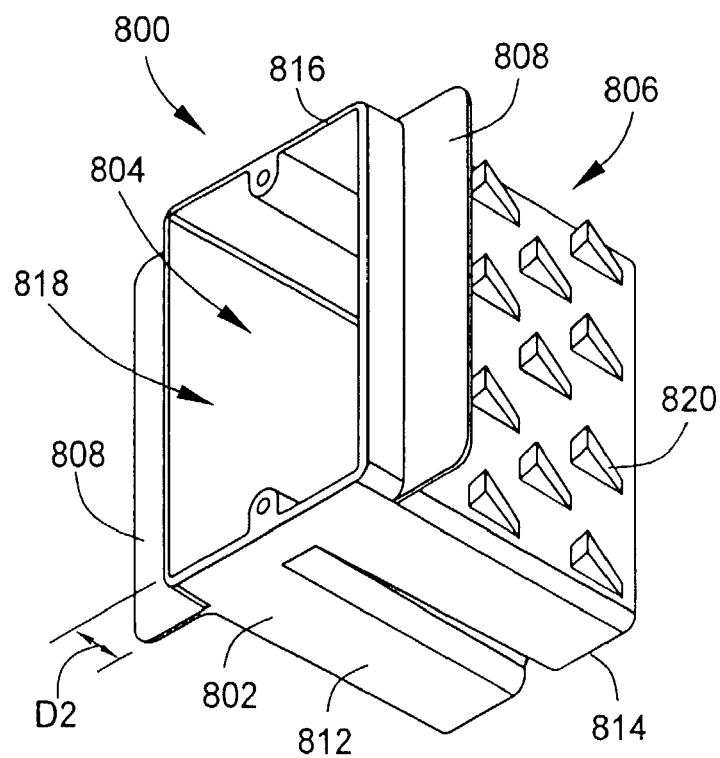
FIG. 8 is a front diagrammatic perspective view of an electrical box designed in accordance with the present invention including protrusions for retaining the electrical box in an ICF element.

Referring to FIG. 8, another embodiment of an electrical box 800 in accordance with the invention will be described. In this embodiment, electrical box 800 has a main body 802 having an electrical box cavity 804 for housing electrical outlets, switches, or electrical connections (not shown).

Electrical box 800 also includes an attaching arrangement 806 for attaching the electrical box to an insulated form of an ICF system. In accordance with the invention, attaching arrangement 806 is configured to allow box 800 to be attached to the foam sidewall of an insulated form block without requiring the use of any additional fasteners to attach the electrical box to the insulated form. As mentioned above, this feature allows electrical boxes designed in accordance with the invention to be quickly and easily installed in an ICF system thereby substantially reducing the time required to install electrical boxes in ICF systems compared to prior art approaches.

In the embodiment illustrated in FIG. 8, attaching arrangement 806 includes front mounting flanges 808. Electrical box 800 also includes sidewalls 812 and back wall 814 which together define cavity 804. Sidewalls 812 have a front edge 816 that extends around all of sidewalls 812 to define a front opening 818 of box 800. In this embodiment, flanges 808 project outward from sidewalls 812 of box 800. Flanges 808 are preferably located near front opening 818 of box 800 and flanges 808 are preferably perpendicular to sidewalls 812 and generally parallel with the plane defined by front edge 816. Flanges 808 are also preferably set back a distance D2 from front edge 816 of box 800 as shown in FIG. 8. This setback causes front edge 816 of box 800 to project outward a distance about equal to distance D2 from the foam insulation of the ICF system when the box is installed in the foam sidewall of the insulated form as will be described in more detail later with reference to FIGS. 11a and 11b. Preferably, distance D2 is selected to be a distance that is approximately equal to the thickness of the drywall that is typically installed over the ICF system wall. This allows front edge 816 of box 800 to project through an opening that would be cut into the drywall when the drywall is installed. This causes front edge 816 to end up substantially flush with the finished surface of the drywall once the drywall is installed.

As illustrated in FIG. 8, electrical box 800 also includes protrusions 820. In this example, protrusions 820 take the form of barbs or wedges positioned at various locations on sidewall 812 of box 800. As will be described in more detail with reference to FIGS. 11a and 11b, barbs or protrusions 820 are configured to cooperate with flanges 808 to grip the foam insulation of an insulated foam sidewall of an ICF system when electrical box 800 is pressed into an opening that has been cut into the foam sidewall with the opening being approximately the same shape and size as the shape and size defined by the exterior of sidewalls 812 of electrical box 800. In accordance with the invention, attaching arrangement 806, which in this example includes flanges 808 and barbs 820, is configured to allow box 800 to be attached to the foam sidewall of an insulated form block without requiring the use of any additional fasteners to attach the electrical box to the insulated form.

Although box 800 has been described as having flanges 808 recessed, or set back from front edge 816 of box 800, this is not a requirement. Instead, flanges 808 may be located flush with front edge 816 or at any other specific location desired so long as flanges 808 cooperate with protrusions 820 to attached box 800 to the foam sidewall of the ICF system without requiring the use of any additional fasteners. Also, in the embodiment shown, flanges 808 are configured to prevent box 800 from being pressed too far into flush with the outer surface of of when the electrical box is installed in an opening formed into the foam insulation of the insulated form.

Figure 9A:
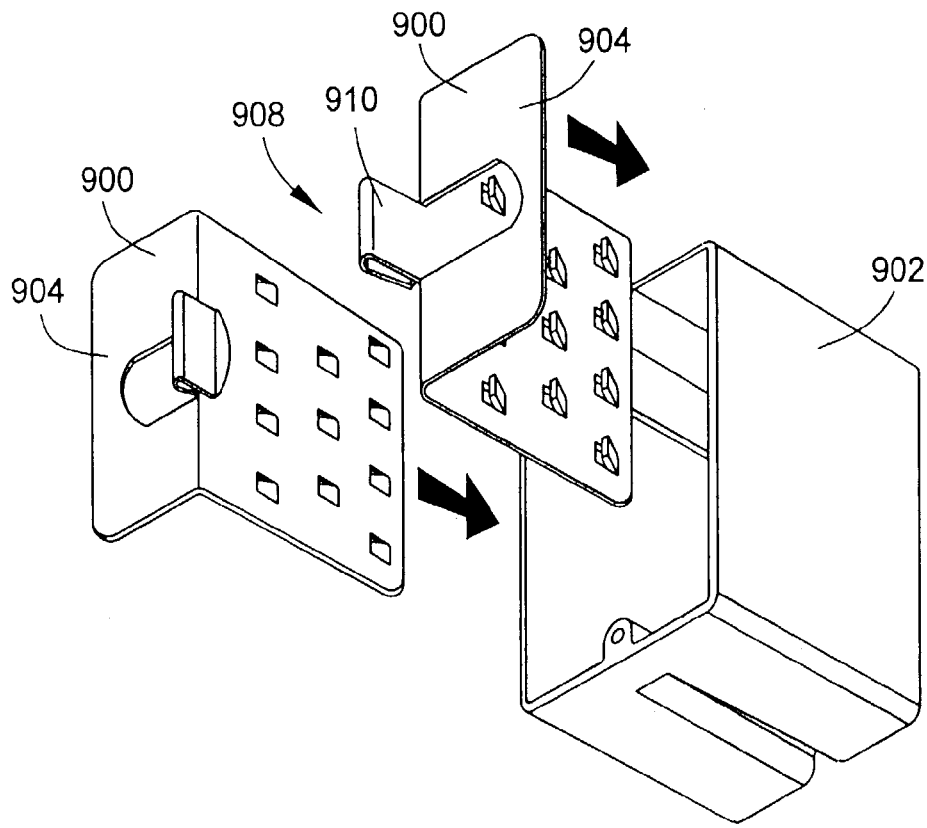
FIGS. 9a and 9b are front diagrammatic perspective views of a second embodiment of an electrical box and clips designed in accordance with the present invention including protrusions for retaining the electrical box in an ICF element.
Figure 9B:
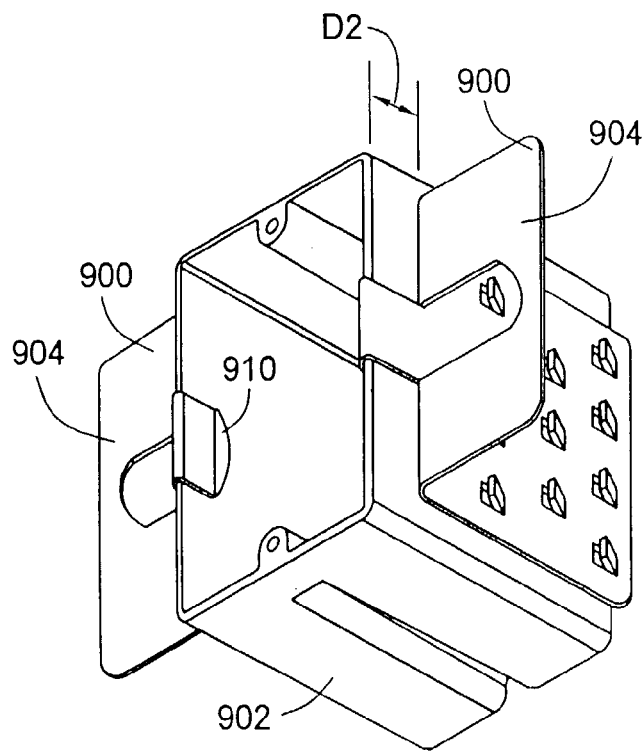

In FIG. 8, attaching arrangement 806, which is made up of flanges 808 and barbs 820, is shown as being integrally formed as part of overall box 800. However, this is not a requirement. Alternatively, the flanges and barbs may be provided as part of a flange clip, such as flange clip 900, that may be attached to a more conventional electrical box, such as electrical box 902, as illustrated in FIGS. 9a and 9b. In the embodiments of FIGS. 9a and 9b, both flange clips 900 include flanges 904 that are similar to flanges 808 described above for FIG. 8. Also, flange clips 900 may be configured such that, when they are installed onto box 902, flanges 904 end up recessed a predetermined distance D2 relative to the edges of the sidewall of the box in a manner similar to that described above for flanges 808.

In the embodiment shown in FIGS. 9a and 9b, flange clips 900 include a fastening arrangement 908 for connecting flange clips 900 to box 902. In this case, fastening arrangement 908 includes a retaining clip 910 which retains flange clip 900 on box 902 when retaining clip 910 is slid over the front edge of box 902. Although fastening arrangement 908 has been described as including retaining clip 910, this is not a requirement. Instead, any readily providable method of fastening flange clips 900 to box 902 may be used and still remain within the scope of the invention.

Figure 10A:
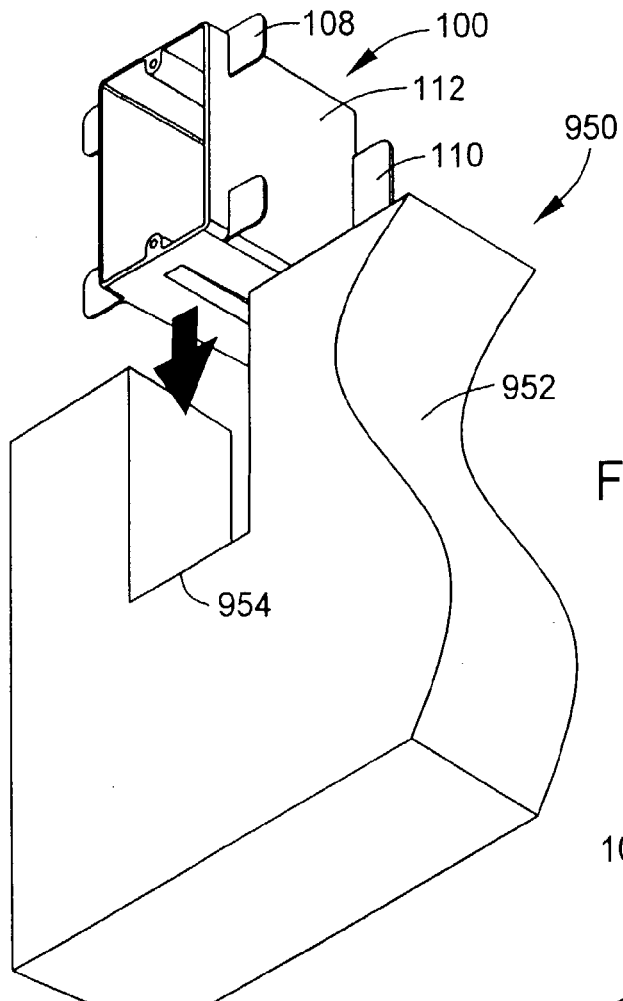
FIGS. 10a and 10b are front diagrammatic perspective views of the electrical box of FIG. 1 being installed in an ICF element in accordance with the present invention.
Figure 10B:
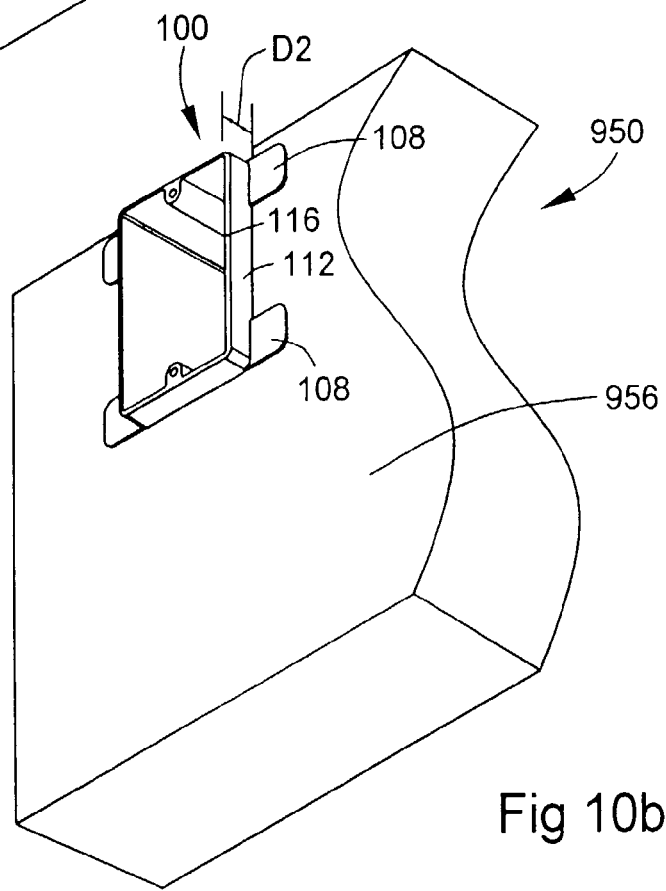

Referring now to FIGS. 10a and 10b, a method of using and installing electrical box 100 of FIGS. 1 and 2 will be described. As mentioned above, ICF systems are typically modular systems made up of standard sized blocks or panels that are assembled on site to create an overall form that is then filled with concrete. In most systems, the standard sized blocks have a uniform overall height, width, and length. The blocks are typically made up of two spaced apart foam sidewalls that have a particular sidewall thickness with 2 inches being a common foam sidewall thickness used for this type of system. Although 2 inches is used here as an example of a typical sidewall thickness, this is not a requirement. Various systems use various insulated foam sidewall thicknesses and the present invention would equally apply regardless of the thickness of the sidewalls of the system. As also mentioned above, other systems use blocks that are molded and that do not have a constant sidewall thickness but instead have a contoured inner wall surface that causes the foam sidewall thickness to vary throughout the block. The present invention would equally apply to these contoured inner wall systems.

For illustrative purposes, the methods of the present invention will be described assuming that an ICF system is being used that includes insulated form blocks that have sidewalls of a uniform thickness. As the insulated form blocks are assembled into a desired overall form, notches are cut into the edges of various blocks at desired locations to provide openings into which electrical boxes are to be installed. FIGS. 10a and 10b illustrate a cut away portion 950 of a sidewall 952 of a typical insulated form block. A notch 954 is cut into a top edge of sidewall 952. This notch is cut to be approximately the same size and shape that is defined by the outer surfaces of sidewalls 112 of box 100. In accordance with the invention, electrical box 100 is attached to sidewall 952 of the insulated form without requiring the use of any additional fasteners to attach the electrical box to the insulated form. In the embodiment shown in FIGS. 10a and 10b, opposing flanges 108 and 110 cooperate to grip foam sidewall 952 when box 100 is slid down into notch 954 as illustrated in FIG. 10a.

As illustrated in FIG. 10b, since flange 108 is recessed by a distance D2 from front edge 116 of box 100, sidewall 112 of electrical box 100 protrudes beyond the external planar surface, designated by reference numeral 956, of the insulated form by a approximately distance D2. As described above, this protruding sidewall of electrical box 100 allows front edge 116 of box 100 to project through an opening that would be cut into drywall that is typically installed over any interior surfaces of ICF system walls. This causes front edge 116 to end up substantially flush with the finished surface of the drywall once the drywall is installed.

After box 100 is inserted into notch 954, conduit sweeps and conduit may be attached to the conduit sockets of electrical box 100 in a conventional manner. Additional layers of insulated form block may then be added to the assembly and additional electrical boxes may be installed as needed. Once the ICF system has been fully assembled and all of the electrical boxes and conduit has been installed, the concrete may be poured into the overall ICF system using normal pouring techniques.

Although the above described method involves installing the electrical boxes as the insulated form blocks are assembled, this is not a requirement. Instead, the electrical boxes may be installed after the ICF system is completely assembled and after the concrete has been poured. Another embodiment of a method in accordance with the invention will be described with reference to FIGS. 11a and 11b. These figures illustrate a cut away view of a small portion of a foam sidewall of an ICF system wall. In this method, the ICF system is fully assembled and the concrete is poured before any of the electrical boxes are installed into the foam sidewalls of the ICF system.

Figure 11A:
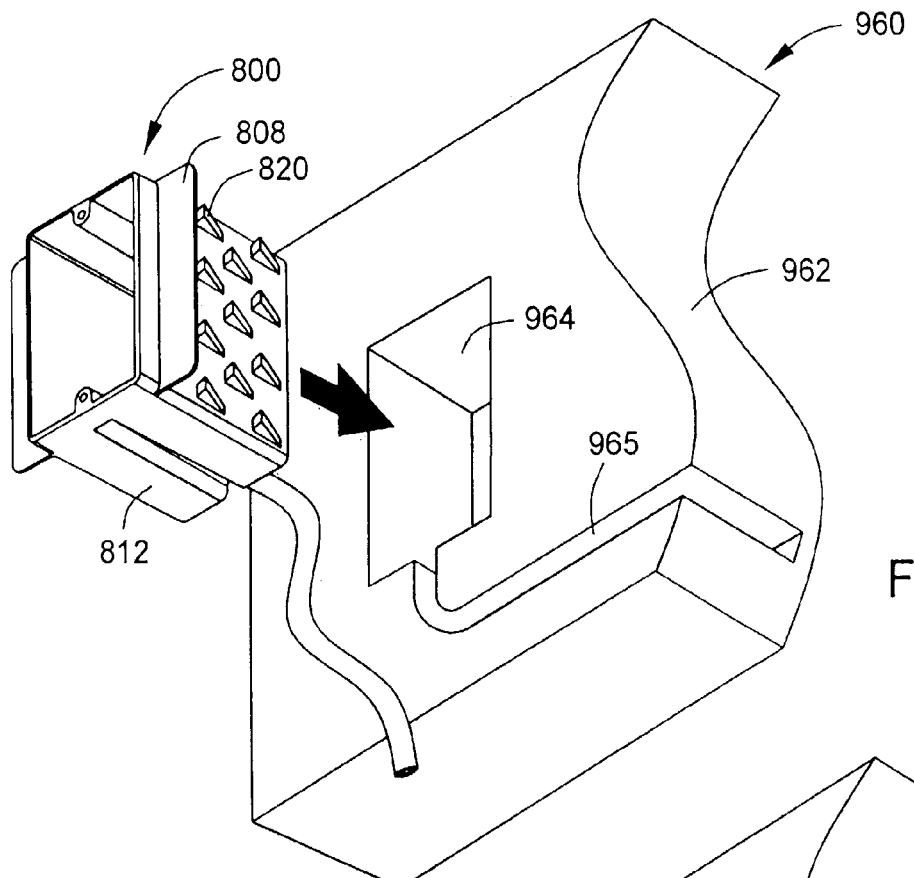
FIGS. 11a and 11b are front diagrammatic perspective views of the electrical box of FIG. 9 being installed in an ICF element in accordance with the present invention.
Figure 11B:
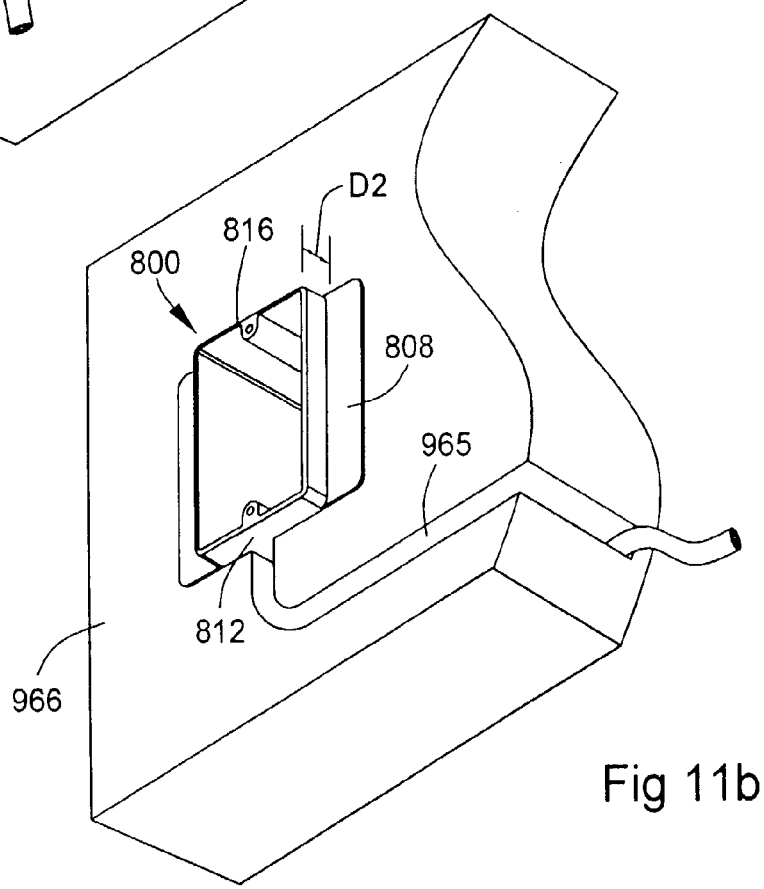

After the concrete has been poured, openings are cut into the foam sidewalls of the ICF system. This may be accomplished using any suitable and readily providable tool such as a router, hot-knife, chainsaw, knife, saw, or other such cutting tool. FIGS. 11a and 11b illustrate a cut away portion 960 of a sidewall 962 of a typical insulated form block. An opening 964 is cut into sidewall 962 at a desired location. This opening is cut to be approximately the same size and shape that is defined by the outer surfaces of sidewalls 812 of box 800. Channels 965 are also cut into foam sidewalls 962 to provide raceways for electrical wire to be run from electrical box to electrical box. In accordance with the invention, electrical box 800 is attached to sidewall 962 of the insulated form without requiring the use of any additional fasteners to attach the electrical box to the insulated form. In the embodiment shown in FIGS. 11a and 11b, flanges 808 and protrusions or barbs 820 cooperate to grip foam sidewall 962 when box 800 is pressed into opening 964 as illustrated in FIG. 11a.

As illustrated in FIG. 11b, since flange 808 is recessed by a distance D2 from front edge 816 of box 800, sidewall 812 of electrical box 800 protrudes beyond the external planar surface, designated by reference numeral 966, of the insulated form by a approximately distance D2. As described above, this protruding sidewall of electrical box 800 allows front edge 816 of box 800 to project through an opening that would be cut into drywall that is typically installed over any interior surfaces of ICF system walls. This causes front edge 816 to end up substantially flush with the finished surface of the drywall once the drywall is installed. After box 800 is inserted into opening 964, electrical wire may be installed in channels 965 to interconnect the electrical boxes.

Although the above-described embodiments have been described with the various components having particular respective orientations, it should be understood that the present invention may take on a wide variety of specific configurations with the various components being located in a wide variety of positions and mutual orientations and still remain within the scope of the present invention. Therefore, the present examples are to be considered as illustrative and not restrictive, and the invention is not to be limited to the details given herein, but may be modified within the scope of the appended claims.

What is claimed is:

1. A method of installing an electrical box in insulated concrete form building systems that utilize insulated forms to form concrete elements, the insulated forms being left in place after the concrete has been poured thereby creating an overall insulated concrete element that includes the concrete and the insulated forms, the insulated form including foam insulation having a front and a back surface, the method comprising the steps of:
   providing an electrical box having a main body that defines an electrical box cavity for housing electrical outlets, switches, and electrical connections, the electrical box including an attaching arrangement for attaching the electrical box to the insulated form, the attaching arrangement of the electrical box including opposing mounting flanges for gripping the foam insulation of the insulated forms,
   before pouring concrete into the insulated concrete form, forming an opening into an edge of the foam insulation, and
   before pouring concrete into the insulated concrete form, attaching the electrical box to the foam insulation of the insulated form without requiring the use of any additional fasteners to attach the electrical box to the insulated form by slipping the electrical box into the opening in the foam insulation such that the opposing mounting flanges grip the front and the back surfaces of the foam insulation and hold the electrical box within the opening formed into the edge of the foam insulation of the insulated form.

2. A method according to claim 1 wherein
   the main body of the electric box includes at least one sidewalk and a back wall that together define the electrical box cavity for housing electrical connections,
   the foam insulation of the insulated form defines an external planar surface of the insulated form, and
   the attaching arrangement is configured such that, when the electrical box is attached to the foam insulation of the insulated form, the sidewall of the electrical box protrudes beyond the external planar surface of the insulated form by a predetermined distance.

3. A method according to claim 1 wherein the opposing mounting flanges are integrally formed as part of the electrical box.

4. A method according to claim 1 wherein the opposing mounting flanges are provided as at least one separate flange element configured to attach to the electrical box.

5. A method according to claim 1 wherein the foam insulation of the insulated form has a predetermined foam thickness and wherein the opposing mounting flanges of the attaching arrangement include at least one pair of opposing flanges that are spaced apart by a distance substantially equal to the thickness of the foam insulation.

6. A method according to claim 1 wherein the foam insulation of the insulated form has a predetermined foam thickness and wherein the opposing mounting flanges of the attaching arrangement include at least one pair of opposing flanges that are spaced apart by a distance greater than the thickness of the foam insulation, the attaching arrangement including a spacer configured to attach to one of the mounting flanges of the pair of opposing mounting flanges to reduce the spacing between the pair of opposing mounting flanges such that the resulting spacing between the spacer and the opposing mounting flange of the pair of opposing mounting flanges is substantially equal to the thickness of the foam insulation.

7. A method according to claim 1 wherein the electrical box is installed in the insulated form before the concrete is poured and wherein the main body of the electric box includes at least one sidewall and a back wall that together define the electrical box cavity for housing electrical connections, the back wall of the electrical box including a substantially clear window portion configured to prevent concrete from entering the electrical box cavity while concrete is being poured and to allow the viewing of the interior of the insulated form around the back wall of the electrical box while concrete is being poured thereby allowing a viewer to confirm that air pockets do not form in the concrete in the area around the back wall of the electrical box while concrete is being poured into the insulated forms.

8. A method according to claim 1 wherein
the electrical box is installed in the insulated form before the concrete is poured,
the electrical box is a molded plastic box and the main body of the electric box includes at least one sidewall and a back wall that together define the electrical box cavity for housing electrical connections, the back wall of the electrical box including at least one conduit socket extending outward from the back wall of the electrical box, the conduit socket being integrally formed as part of the electrical box and the conduit socket providing a port to allow for the entrance and exit of electrical conductors, the conduit socket being configured to mate with standard plastic electrical conduit, and
the method includes the step of installing electrical conduit to the electrical box within the insulated form before the concrete is poured, and thereafter, pouring the concrete and encapsulating the electrical conduit in the concrete.

9. A method according to claim 8 wherein the conduit socket is a substantially tubular shaped structure having an inside diameter and an outside diameter, the inside diameter of the conduit socket being a diameter that allows for the insertion and conventional attachment of standard ½ inch plastic electrical conduit within the conduit socket and the outside diameter of the conduit socket being a diameter that allows for the insertion and conventional attachment of standard ¾ inch plastic electrical conduit around the outside of the conduit socket.

10. A method according to claim 8 wherein the electrical box includes two conduit sockets extending outward from the back wall of the electrical box, the two conduit sockets being offset relative to one another both vertically and horizontally on the back wall of the electrical box.

11. A method according to claim 1 wherein the electrical box is a multiple gang electrical box including a main body having an electrical box cavity for housing multiple electrical connections.

* * * * *